United States Patent
Rajagopalan et al.

(10) Patent No.: US 10,775,235 B2
(45) Date of Patent: Sep. 15, 2020

(54) METHODS AND SYSTEMS FOR CAMERA-BASED AMBIENT LIGHT ESTIMATION

(71) Applicant: SIGNIFY HOLDING B.V., Eindhoven (NL)

(72) Inventors: Ruben Rajagopalan, Neuss (DE); Harry Broers, 'S-Hertogenbosch (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/321,102

(22) PCT Filed: Jul. 12, 2017

(86) PCT No.: PCT/EP2017/067539
§ 371 (c)(1),
(2) Date: Jan. 28, 2019

(87) PCT Pub. No.: WO2018/019588
PCT Pub. Date: Feb. 1, 2018

(65) Prior Publication Data
US 2019/0178711 A1     Jun. 13, 2019

(30) Foreign Application Priority Data
Jul. 28, 2016   (EP) .................................. 16181770

(51) Int. Cl.
H05B 47/10     (2020.01)
H05B 45/10     (2020.01)
(Continued)

(52) U.S. Cl.
CPC .......... *G01J 1/4204* (2013.01); *G01J 1/0437* (2013.01); *G01J 1/44* (2013.01); *H05B 45/10* (2020.01);
(Continued)

(58) Field of Classification Search
CPC ............ H05B 37/0218; H05B 37/0272; H05B 37/0245; H05B 33/0872; H05B 37/0254;
(Continued)

(56) References Cited

U.S. PATENT DOCUMENTS 8,674,608 B2 * 3/2014 Holland ............ H05B 33/0854
                                                 315/149
9,603,223 B2 * 3/2017 Patel .................. H05B 37/0218
(Continued)

FOREIGN PATENT DOCUMENTS

DE          19514973 A1    10/1996
WO      WO2015022611 A1    2/2015

OTHER PUBLICATIONS

Kontaxis, P.A., et al., "Applications of CCD Sensors in Photometry and in Daylight Responsive Systems," National Technical University of Athens, Lighting Lab, Technological Educational Institute of Athens, Balkan Light, 2012 (8 Pages).

Primary Examiner — Vibol Tan
(74) Attorney, Agent, or Firm — Meenakshy Chakravorty

(57) ABSTRACT

A lighting unit (10) for estimating an amount of daylight in a lighting environment includes: a light source (12); a filter (330) configured to block incident light in a first wavelength range, the incident light comprising both daylight and non-daylight incident light; a camera (32) configured to receive the filtered incident light and generate a detection signal (342), the filtered incident light being outside the first wavelength range; and a controller (22) in communication with the camera and configured to process the detection signal to estimate the amount of daylight incident light.

10 Claims, 6 Drawing Sheets

(51) Int. Cl.
*G01J 1/42* (2006.01)
*H05B 47/11* (2020.01)
*H05B 47/175* (2020.01)
*H05B 45/20* (2020.01)
*G01J 1/04* (2006.01)
*G01J 1/44* (2006.01)

(52) U.S. Cl.
CPC .............. *H05B 45/20* (2020.01); *H05B 47/10* (2020.01); *H05B 47/11* (2020.01); *H05B 47/175* (2020.01); *G01J 2001/4446* (2013.01); *Y02B 20/46* (2013.01)

(58) Field of Classification Search
CPC ............ H05B 33/0821; H05B 33/0869; H05B 33/0854; H05B 33/0812; H05B 33/0815; H05B 37/02; H05B 39/042; H05B 47/11; Y02B 20/46; G01J 1/4204; G01J 1/44; G01J 1/0437; G01J 2001/4446; E06B 2009/6818; E06B 2009/6827
See application file for complete search history.

(56) References Cited

U.S. PATENT DOCUMENTS

| | | | |
|---|---|---|---|
| 9,854,647 B2* | 12/2017 | Knaapen | H05B 33/0869 |
| 10,064,255 B2* | 8/2018 | Barroso | H05B 37/0245 |
| 10,201,058 B2* | 2/2019 | Shan | H05B 37/0218 |
| 10,210,426 B2* | 2/2019 | Rajagopalan | G01B 11/002 |
| 2004/0105264 A1 | 6/2004 | Spero | |
| 2008/0272277 A1* | 11/2008 | Wei | G01J 1/32 |
| | | | 250/205 |
| 2009/0195187 A1* | 8/2009 | Chen | H04N 5/2256 |
| | | | 315/294 |
| 2012/0039592 A1* | 2/2012 | Chou | G03B 7/08 |
| | | | 396/164 |
| 2012/0068600 A1 | 3/2012 | Hartmann et al. | |
| 2013/0271015 A1* | 10/2013 | Peng | H05B 37/0227 |
| | | | 315/158 |
| 2014/0042913 A1 | 2/2014 | Yang et al. | |
| 2014/0192177 A1 | 7/2014 | Bartula et al. | |
| 2014/0292208 A1 | 10/2014 | Chemel et al. | |
| 2015/0076992 A1* | 3/2015 | Walma | H05B 37/0218 |
| | | | 315/153 |

* cited by examiner

600

```
Provide a lighting unit comprising one or more light sources, an incident light
filter, and a camera
610
```

```
Receiving, at the lighting unit, ambient light
620
```

```
Filtering, by the light filter, a first wavelength range of the incident light
630
```

```
Detecting, by the camera, light outside the first wavelength range
640
```

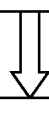

```
Estimating the amount of daylight in the lighting environment
650
```

```
Adjust one or more light sources based on the estimated amount of daylight
660
```

FIG. 6

METHODS AND SYSTEMS FOR CAMERA-BASED AMBIENT LIGHT ESTIMATION

CROSS-REFERENCE TO PRIOR APPLICATIONS

This application is the U.S. National Phase application under 35 U.S.C. § 371 of International Application No. PCT/EP2017/067539, filed on Jul. 12, 2017, which claims the benefit of European Patent Application No. 16181770.5, filed on Jul. 28, 2016. These applications are hereby incorporated by reference herein.

FIELD OF THE INVENTION

The present disclosure is directed generally to methods and systems for camera-based estimation of ambient light for indoor and outdoor lighting systems.

BACKGROUND

Sensor-driven lighting units monitor a characteristic of the environment with a sensor and utilize the sensor data to control the light source of the lighting unit. The most common example of sensor-driven lighting units are systems that monitor light levels using integrated photocells that measure ambient light levels. For example, night lights use ambient light to turn on when ambient light levels decrease and to turn off when ambient light levels increase. Similarly, smart street lighting uses detected ambient light to determine when to turn the light source on and off. Most often, the light level is monitored by a photocell directed towards the sky to observe the ambient light conditions. In which direction the photocell is directed, or which surface or area is utilized for light level monitoring, is driven primarily by product design. In most devices there is no relationship between the surface or area from which the ambient light level is monitored and the target surface to be illuminated.

For a wide variety of reasons, it is important that sensor-driven lighting units and systems have the most accurate estimate possible for the contribution of ambient light for advanced light control. State-of-the-art lighting systems and luminaires, for example, have embedded sensors with lux-metering functionality to estimate the overall ambient light in order to enable their integrated illumination and/or sensing systems. These sensors however, do not consider the source or various contributors of the ambient light. For example, outdoor lighting systems such as streetlights and other units do not separate the contribution of daylight from neighboring light sources or other light sources, and certainly do not do so while taking the overall ambient light into consideration.

Accordingly, there is a continued need in the art for methods and systems that measure and characterize the various contributors of ambient light in a sensor-driven lighting unit, in order to provide advanced light control.

SUMMARY OF THE INVENTION

The present disclosure is directed to inventive methods and apparatus for camera-based estimation of ambient light for indoor and outdoor lighting systems. Various embodiments and implementations herein are directed to a lighting unit with a color camera with a band-stop filter that allows visible and near infra-red light to pass through. Daylight contribution, for example, can be separated or identified using signal processing of pixel information of red, blue, and/or green color channels. This separates the ambient light into daylight contribution versus artificial light contribution. The lighting unit can then utilize the more accurate ambient light estimate in order to adjust one or more characteristics of the light emitted by a light source of the lighting unit.

Generally, in one aspect, a lighting unit for estimating an amount of daylight in a lighting environment is provided. The lighting unit includes: a light source; a filter configured to block incident light in a first wavelength range, wherein the incident light comprises both daylight and non-daylight incident light; a camera configured to receive the filtered incident light and generate a detection signal, wherein the filtered incident light is outside the first wavelength range; and a controller in communication with the camera and configured to process the detection signal and estimate the amount of daylight incident light.

According to an embodiment, the first wavelength range is configured to block at least a portion of the non-daylight incident light. According to another embodiment, the first wavelength range is configured to block all of the non-daylight incident light.

According to an embodiment, an upper limit of the first wavelength range is between approximately 550 and 700 nm. According to an embodiment, the upper limit of the first wavelength range is approximately 650 nm.

According to an embodiment, the controller is further configured to adjust a parameter of the light source based on the estimated amount of daylight incident light. According to an embodiment, the parameter is an intensity of light emitted by the lighting unit.

According to an embodiment, the camera is configured to receive light in wavelengths between approximately 650 and 1000 nm.

According to an embodiment, the camera comprises an infrared sensor.

According to an aspect, a method for estimating an amount of daylight in a lighting environment is provided. The method includes the steps of: receiving incident light at a lighting unit, wherein the incident light comprises both daylight and non-daylight incident light; filtering, by a filter of the lighting unit, a first wavelength range of the incident light; detecting, with a camera of the lighting unit, the filtered incident light to generate a detection signal, wherein the filtered incident light is outside the first wavelength range; and estimating, using the detection signal, an amount of daylight incident light.

According to an aspect, a lighting system for estimating an amount of daylight in a lighting environment is provided. The lighting system includes: a lighting unit comprising a light source and a controller; and a camera comprising a filter configured to block incident light in a first wavelength range, wherein the incident light comprises both daylight and non-daylight incident light, and wherein the camera is configured to receive the filtered incident light outside the first wavelength range to generate a detection signal; wherein the controller is configured to receive the detection signal from the camera and process to the detection signal to estimate the amount of daylight incident light.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semiconductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, tribo luminescent sources, sonoluminescent sources, radio luminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 6 is a flow chart of a method for camera-based estimation of ambient light, in accordance with an embodiment.

DETAILED DESCRIPTION OF EMBODIMENTS

The present disclosure describes various embodiments of a sensor-based lighting unit configured to determine one or more contributions to ambient light detected by the lighting unit. More generally, Applicant has recognized and appreciated that it would be beneficial to provide a lighting unit, fixture, or system that separates the ambient light into daylight contribution versus artificial light contribution. A particular goal of utilization of certain embodiments of the present disclosure is to provide advanced light control by obtaining an accurate estimate of daylight contribution versus non-daylight contribution to detected ambient light.

In view of the foregoing, various embodiments and implementations are directed to a lighting unit or system with a color camera comprising a band-stop filter that allows visible and near infra-red light to pass through. The received data is analyzed using signal processing of pixel information of red, blue, and/or green color channels, and the daylight contribution to the ambient light is determined. The lighting unit then controls the one or more light sources based at least in part on the accurate estimate of daylight contribution versus non-daylight contribution to detected ambient light.

Figure 1:
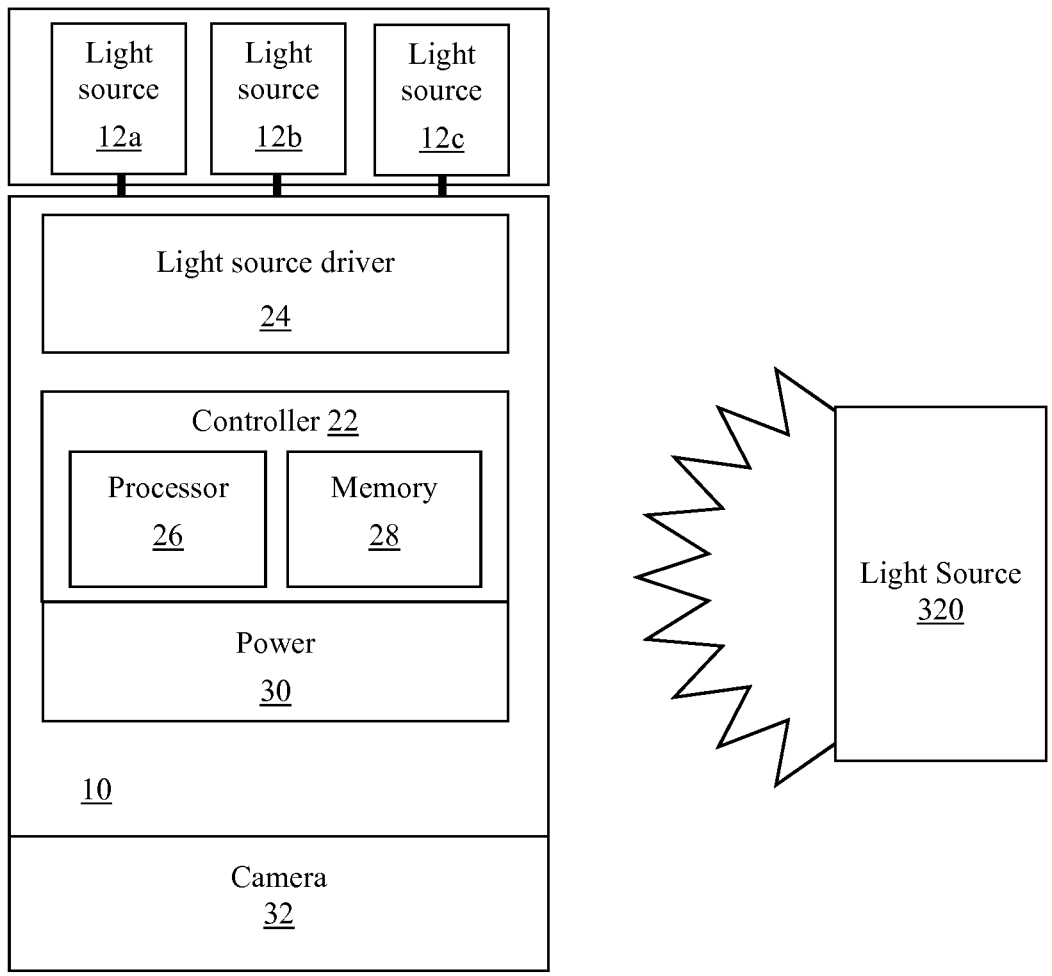
FIG. 1 is a schematic representation of a lighting unit, in accordance with an embodiment.

Referring to FIG. 1, in one embodiment, a lighting unit 10 is provided that includes one or more light sources 12, where one or more of the light sources may be an LED-based light source. Further, the LED-based light source may have one or more LEDs. The light source can be driven to emit light of predetermined character (i.e., color intensity, color temperature) by one or more light source drivers 24. Many different numbers and various types of light sources (all LED-based light sources, LED-based and non-LED-based light sources alone or in combination, etc.) adapted to generate radiation of a variety of different colors may be employed in the lighting unit 10. According to an embodiment, lighting unit 10 can be any type of lighting fixture, including but not limited to a night light, a street light, a table lamp, or any other interior or exterior lighting fixture.

According to an embodiment, lighting unit 10 includes a controller 22 which is configured or programmed to output one or more signals to drive the one or more light sources 12 and generate varying intensities, directions, and/or colors of light from the light sources. For example, controller 22 may be programmed or configured to generate a control signal for each light source to independently control the intensity and/or color of light generated by each light source, to control groups of light sources, or to control all light sources together. According to another aspect, the controller 22 may control other dedicated circuitry such as light source driver 24 which in turn controls the light sources so as to vary their intensities. Controller 22 can be or have, for example, a processor 26 programmed using software to perform various functions discussed herein, and can be utilized in combination with a memory 28. Memory 28 can store data, including one or more lighting commands or software programs for execution by processor 26, as well as various types of data including but not limited to specific identifiers for that lighting unit. For example, the memory 28 may be a non-transitory computer readable storage medium that includes a set of instructions that are executable by processor 26, and which cause the system to execute one or more of the steps of the methods described herein.

Controller 22 can be programmed, structured and/or configured to cause light source driver 24 to regulate the intensity and/or color temperature of light source 12 based on predetermined data, such as ambient light conditions, among others, as will be explained in greater detail hereinafter. According to one embodiment, controller 22 can also be programmed, structured and/or configured to cause light source driver 24 to regulate the intensity and/or color temperature of light source 12 based on communications received by a wired or wireless communications module. A wireless communications module can be, for example, Wi-Fi, Bluetooth, IR, radio, or near field communication that is positioned in communication with controller 22 or, alternatively, controller 22 can be integrated with the wireless communications module.

Lighting unit 10 also includes a source of power 30, most typically AC power, although other power sources are possible including DC power sources, solar-based power sources, or mechanical-based power sources, among others. The power source may be in operable communication with a power source converter that converts power received from an external power source to a form that is usable by the lighting unit. In order to provide power to the various components of lighting unit 10, it can also include an AC/DC converter (e.g., rectifying circuit) that receives AC power from an external AC power source 30 and converts it into direct current for purposes of powering the light unit's components. Additionally, lighting unit 10 can include an energy storage device, such as a rechargeable battery or capacitor, that is recharged via a connection to the AC/DC converter and can provide power to controller 22 and light source driver 24 when the circuit to AC power source 30 is opened.

In addition, lighting unit 10 includes a camera 32 that is connected to an input of controller 22 and collects ambient light data in the vicinity of lighting unit 10 and can transmit that data to controller 22, or externally via a wireless communications module. In some embodiments such as system 200 depicted in FIG. 2, camera 32 is remote from the lighting unit 10 and transmits obtained sensor data to a wireless communications module of the lighting unit. According to an embodiment, the camera 32 is spatially positioned in order to achieve one or more operational goals. This ensures that the region within the lighting environment for which the camera 32 obtains information is appropriate for the lighting unit's functionality. Camera 32 can be any camera capable of detecting information about electromagnetic radiation. For example, the camera 32 may be capable of detecting a certain wavelength, a wavelength range, and/or several different wavelengths. According to an embodiment, the camera can comprise RBG elements, infrared (IR) elements, both RGB and IR elements, and/or other elements. The camera may also be, for example, a Time-of-Flight (ToF) imaging system, among many other types of imaging systems capable of detecting electromagnetic radiation.

Figure 2:
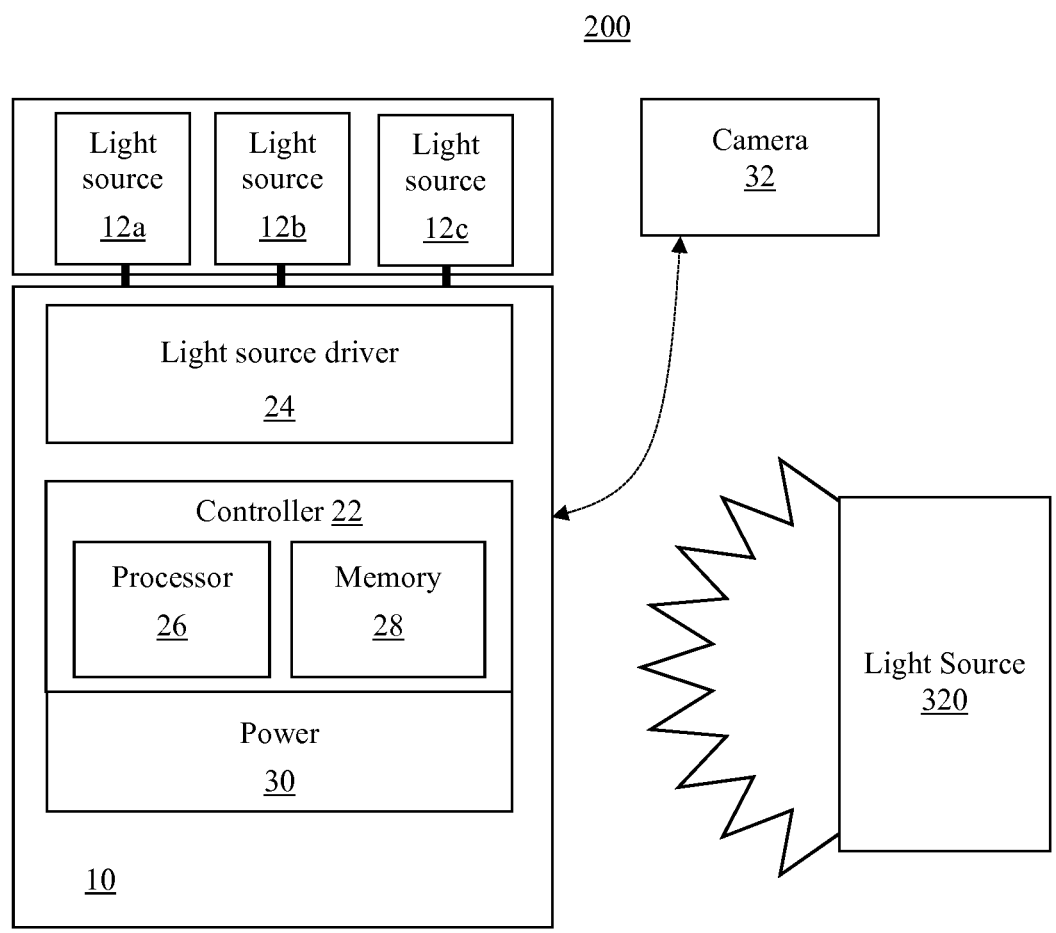
FIG. 2 is a schematic representation of a lighting system, in accordance with an embodiment.

Referring to FIG. 2, in one embodiment, a lighting system 200 is provided that includes a lighting unit 10. Lighting unit 10 can be any of the embodiments described herein or otherwise envisioned, and can include any of the components of the lighting units described in conjunction with FIG. 1, such as one or more light sources 12, light source driver 24, and controller 22, among other elements. Lighting system 200 also includes a remote camera 32, which communicates via a wired and/or wireless communications link to lighting unit 10.

Figure 3:
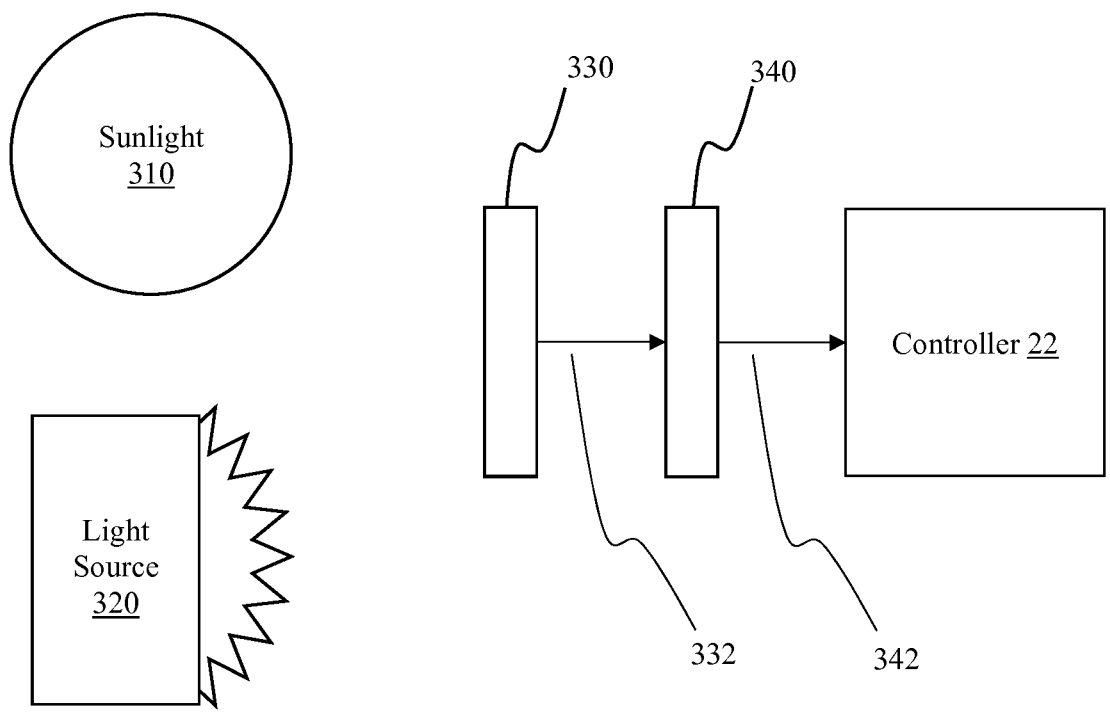
FIG. 3 is a schematic representation of a camera and filter within a lighting environment, in accordance with an embodiment.

Referring to FIG. 3, in one embodiment, is a portion of a lighting system or unit 300. Electromagnetic radiation is emitted from multiple different sources, such as daylight 310 and/or one or more light sources 320. The one or more light sources 320 can be, for example, a neighboring lighting fixture, lights in or on a building, light reflected from various surfaces, or any of a wide variety of other possible light sources. This ambient electromagnetic radiation is received by the camera 32 and analyzed as described herein. The camera 32 comprises a filter 330 that allows certain frequencies of a first range to pass through the filter while rejecting or attenuating frequencies outside that first range. For example, the filter 330 may block incident visible light within the incident electromagnetic radiation in a wavelength range up to at least substantially 550 nm, preferably up to approximately 600 nm, even more preferably up to 650 nm or 700 nm. The filtered incident light 332 is then sensed by a color sensor 340, and the image data, detection signal 342, is transmitted to the controller 22 for processing and/or analysis, including identification of the daylight contribution to the ambient electromagnetic radiation detected by the camera. Preferably, the detection sensor 340 comprises a color filter array generating a red color signal, a green color signal, and a blue color signal as conventionally provided by an RGB color sensor.

Figure 4:
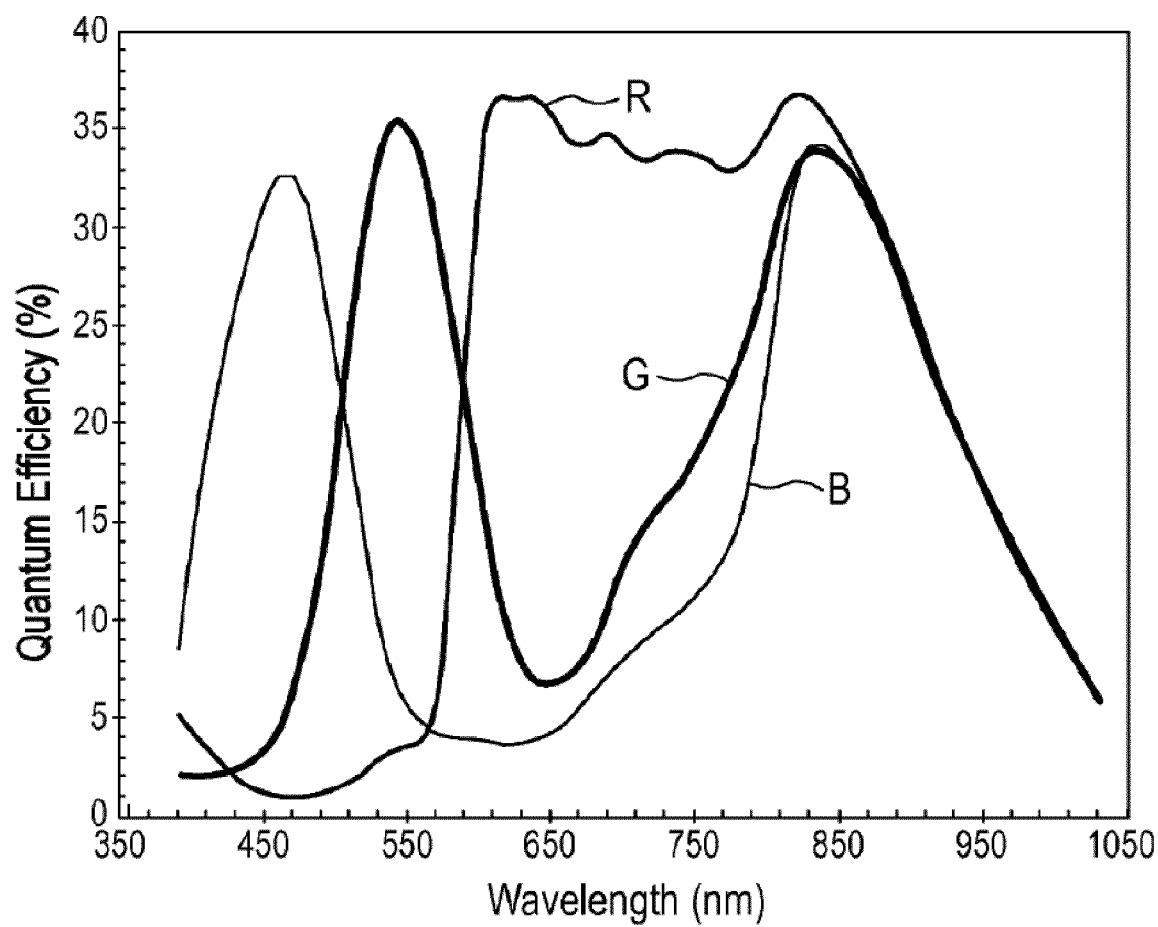
FIG. 4 is a graph of the spectral characteristics of a conventional color sensor.

According to an embodiment, the filter 330 is configured or chosen to block visible light to a predetermined threshold wavelength, typically in the range from 550 to 700 nm. Referring to FIG. 4, for example, is a graph of a sensitivity curve B for blue light, the sensitivity curve G for green light, and the sensitivity curve R for red light, without a filter. Although some cameras are equipped with infrared block filters to block infrared light, particularly in the wavelength range above 650 nm, in order to avoid influence of light from outside the visible range, according to an embodiment the camera 32 does not comprise such an IR block filter is removed. FIG. 4, therefore, shows the contribution of both daylight and other ambient light sources. In particular, neighboring LED are generally configured to generate radiation in various portions of the visible spectrum, generally including radiation wavelengths from approximately 400 nm to approximately 700 nm.

Figure 5:
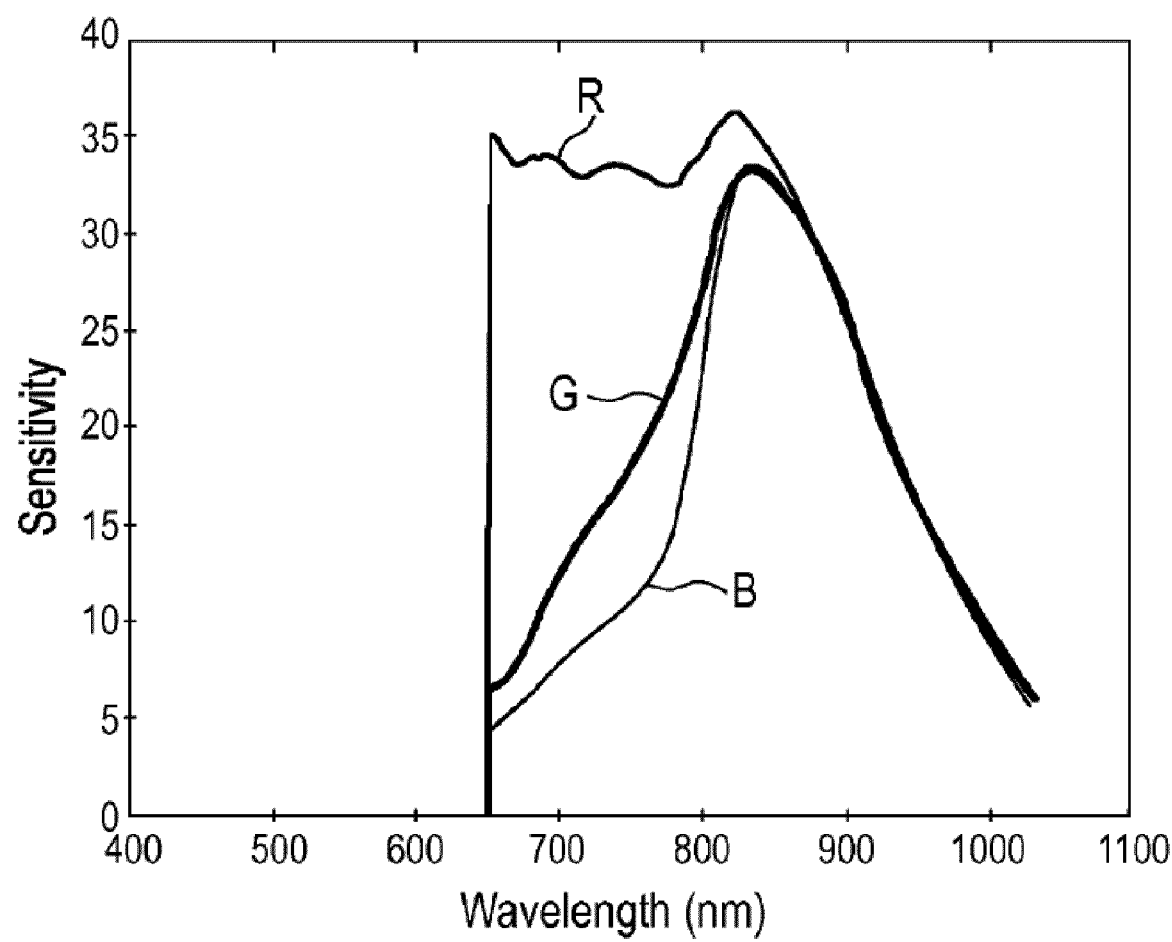
FIG. 5 is a graph of the spectral characteristics of light analyzed by a lighting unit in accordance with an embodiment.

Referring to FIG. 5, in one embodiment, is a graph of the sensitivity curves R, G, and B for the spectra that are allowed to pass through filter 330. The majority of this light will be ambient daylight, direct and/or indirect. This is the filtered incident light 332 that is sensed by a color sensor 340. Since all or the majority of the non-daylight electromagnetic radiation has been blocked by the filter (including but not limited to most or all LED light between approximately 400 nm to approximately 700 nm), the camera will detect entirely or mostly incident daylight electromagnetic radiation.

According to another embodiment, the camera comprises an infrared (IR) sensor. For example, detection sensor 340 may be an infrared sensor, or may be both a color sensor and an infrared sensor. A camera with both RGB and IR elements can be configured to obtain both RBG and IR information, or may be configured to only provide one type of information for this particular process. According to an embodiment, if the filter 330 is configured or chosen to block visible light to a predetermined threshold wavelength, typically in the range from 550 to 700 nm, much of the electromagnetic radiation 332 passing through the filter will be IR with a wavelength of approximately 700 nm to 1000 nm. Accordingly, if detection sensor 340 is a camera with both RGB and IR elements, it can detect both RGB and IR information in the range above the upper limit or threshold of the filter, preferably at or about 700 nm.

According to an embodiment, the ability to detect both RGB and IR information at a wavelength range outside the filter range is especially beneficial in conditions where the camera or lighting unit can be installed in many different locations. For example, if a lighting unit could be installed either inside or outside, it may need to detect both RGB and IR information. When the lighting unit is installed outside, it could utilize solely the IR information from the camera 32. When the lighting unit is installed inside, however, it may be installed behind windows or glass that has a film or coating that intentionally or inadvertently lessens the amount of infrared light entering the window or glass. For example, some films or coatings can significantly lessen the amount of transmitted infrared light. In this scenario, the lighting unit could utilize solely the RGB information from the camera 32.

Referring to FIG. 6, in one embodiment, a flow chart illustrating a method 600 for estimating daylight in ambient electromagnetic radiation. In step 610, a lighting unit 10 is provided. Lighting unit 10 can be any of the embodiments described herein or otherwise envisioned, and can include any of the components of the lighting units described in conjunction with FIGS. 1 and 2, such as one or more light sources 12, light source driver 24, controller 22, and camera 32, among other elements. According to an embodiment, the lighting unit lacks a filter to block IR, but comprises a filter to allow only light in the IR range of the light spectrum to reach the camera. In other words, the camera of the lighting unit only receives light in the range of approximately 650-700 nm to 1000 nm. This is achieved, for example, by a band-stop filter that attenuates frequencies in a specific range, and/or a band-pass filter that allows frequencies within a specific range.

At step 620 of the method, the lighting unit receives ambient electromagnetic radiation. As shown in FIG. 3, for example, electromagnetic radiation can be emitted from multiple different sources, such as daylight 310 and/or one or more light sources 320. The one or more light sources 320 can be, for example, a neighboring lighting fixture, lights in or on a building, light reflected from various surfaces, or any of a wide variety of other possible light sources. Typically, the daylight 310 will include electromagnetic radiation with wavelengths both below and above 700 nm, while the one or more light sources 320 will typically include electromagnetic radiation with wavelengths below 700 nm.

At step 630 of the method, the lighting unit blocks electromagnetic radiation with wavelengths below approximately 650-700 nm, and allows electromagnetic radiation with wavelengths above approximately 650-700 nm to pass through. This is achieved, for example, by a band-stop filter that attenuates frequencies in a specific range, and/or a band-pass filter that allows frequencies within a specific range. Since daylight will include electromagnetic radiation with wavelengths both below and above 700 nm, while non-daylight light sources will typically include electromagnetic radiation with wavelengths below 700 nm, allowing wavelengths above approximately 650-700 nm to pass through will allow detection of primarily daylight.

According to an embodiment, the filter can be selected and/or optimized based on known information or spectral characteristics about neighboring lighting units. For example, if the lighting environment is known to contain a large number of lighting units that emit light of a certain wavelength, the filter can be selected to block one or more wavelengths that include this certain wavelength. According to another embodiment, the filter is or comprises an optical element placed over camera 32, which is optimized for one or more polarization characteristics of daylight and other known and unknown light sources in the lighting environment. According to yet another embodiment, one or more temporal switching characteristics of the optical element are modified and/or optimized in accordance with the known temporal modulation of known light sources in the lighting environment.

At step 640 of the method, the camera 32 of lighting unit 10 detects the light that passes through the filter 330. The camera 32 preferably detects red, green, and/or blue light, although the camera and/or the lighting unit may use only one or two of those channels for further analysis. The camera 32 can transmit the obtained data, such as color and/or intensity data, to the processor 22 of the lighting unit.

At step 650 of the method, the lighting unit 10 analyzes the data obtained by the camera 32 in order to estimate the amount of daylight and artificial electromagnetic radiation in the lighting environment. For example, the system can utilize signal-processing techniques on the pixel information of the red, green, and/or blue color channels to estimate the daylight contribution to the lighting environment.

According to an embodiment, in addition to estimating the daylight contribution to the lighting environment, the lighting unit or system may also estimate the proportion of daylight contribution to total incident light detected by the lighting unit. Additional or alternatively, the lighting unit or system may also estimate the proportion of non-daylight contribution to total incident light detected by the lighting unit. For example, the camera may obtain data with and without the filter, and utilize both sets of data to estimate the proportion of daylight contribution to total incident light detected by the lighting unit. For example, without the filter, the camera will characterize the total incident light in the lighting environment. With the filter, the camera will characterize the daylight in the lighting environment. By comparing the two, the lighting system can estimate the proportion of daylight contribution to total incident light detected by the lighting unit. According to another embodiment, rather than the camera obtaining data with and without the filter, the lighting unit may comprise multiple sensors to obtain this information. For example, the lighting unit may comprise the camera 32 to obtain the filtered light information, and may also comprise a second camera or another light sensor to obtain and/or characterize the total incident light in the lighting environment.

At optional step 660 of the method, the controller utilizes the estimated daylight and/or non-daylight contribution information to adjust or otherwise adapt a parameter of the light source or the light profile emitted by the lighting unit or system. According to an embodiment, the controller can adjust the beam width, angle, and/or intensity of one or more light sources based on the estimate. For example, the controller can adjust one or more light sources, such as turning the light on or off, when the estimated daylight falls below or above a certain threshold. The information could also be utilized to control the sensitivity and/or performance of one or more other sensors in order to reduce the effect of false triggers. Similarly, the information could be utilized to change a feature, parameter, or characteristic of the lighting environment over which the system has control. For example, the controller could direct a window shade to open or close, or can direct an object within the lighting environment to move from one location to another location.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method for estimating an amount of daylight in a lighting environment, the method comprising the steps of:
   receiving incident light at an input of a filter comprised in a camera, wherein the incident light comprises both daylight and non-daylight incident light;
   filtering, by the filter, a first wavelength range of the incident light, wherein the first wavelength range is configured with an upper limit between approximately 550 and 700 nm to allow the filter to block at least a portion of the non-daylight incident light;
   detecting, by the camera, the filtered incident light to generate a detection signal, wherein the filtered incident light is outside the first wavelength range, wherein the detection signal includes a red channel, a green channel, and a blue channel;
   transmitting, by a second communications module comprised in the camera, the detection signal;
   receiving, by a first communications module comprised in a lighting unit, the detection signal; and
   estimating, by a controller comprised in the lighting unit, using the detection signal, an amount of daylight incident light.

2. The method of claim 1, wherein the camera is configured to receive light in wavelengths between approximately 650 and 1000 nm.

3. The method of claim 1, further comprising the step of adjusting, based on the estimated amount of daylight incident light, a parameter of the lighting unit.

4. The method of claim 3, wherein said parameter is an intensity of light emitted by the lighting unit.

5. The method of claim 1, wherein the camera comprises an infrared sensor.

6. A lighting system for estimating an amount of daylight in a lighting environment, the lighting system comprising:
   a lighting unit comprising a light source emitting non-daylight light with radiation wavelength from approximately 400 nm to approximately 700 nm, a controller, and a first communications module; and
   a camera, remote from the lighting unit, comprising a filter and a second communications module, and wherein the filter is configured to block incident light in a first wavelength range that is configured with an upper limit between approximately 550 and 700 nm to allow the filter to block at least a portion of the non-daylight incident light, and wherein the incident light comprises both daylight and non-daylight incident light, and wherein the camera is configured to receive the filtered incident light outside the first wavelength range to generate a detection signal, wherein the detection signal includes a red channel, a green channel, and a blue channel, and where the second communications module is configured to send the detection signal to the first communications module;

wherein the first communications module is configured to receive the detection signal, and the controller is configured to process the detection signal to estimate the amount of daylight incident light.

7. The method of claim 1, further comprising a step of filtering, by the filter, a first wavelength range of the incident light, wherein the first wavelength range is configured with an upper limit between approximately 550 and 700 nm to allow the filter to block all of the non-daylight incident light.

8. The lighting system of claim 6, wherein the controller is further configured to adjust a parameter of the light source based on the estimated amount of daylight incident light.

9. The lighting system of claim 6, wherein the camera is configured to receive light in wavelengths between approximately 650 and 1000 nm.

10. The lighting system of claim 6, wherein the camera comprises an infrared sensor.

* * * * *